United States Patent
Iizuka

(10) Patent No.: US 7,500,856 B2
(45) Date of Patent: Mar. 10, 2009

(54) ELECTRICAL JUNCTION BOX

(75) Inventor: Tetsuya Iizuka, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 0 days.

(21) Appl. No.: 11/819,432

(22) Filed: Jun. 27, 2007

(65) Prior Publication Data
US 2008/0020606 A1    Jan. 24, 2008

(30) Foreign Application Priority Data
Jul. 18, 2006   (JP)  ............................. 2006-196201

(51) Int. Cl.
*H01R 12/00* (2006.01)
(52) U.S. Cl. .................................. 439/76.2
(58) Field of Classification Search ............... 439/76.2, 439/374–375, 495, 34; 174/58, 50, 53, 52.1, 174/61
See application file for complete search history.

(56) References Cited
U.S. PATENT DOCUMENTS 6,319,045 B1 * 11/2001 Sawayanagi et al. ........ 439/374
6,923,660 B2   8/2005 Takeuchi
7,017,764 B2 * 3/2006 Okada ......................... 220/3.2
7,075,006 B2 * 7/2006 Nojima et al. ................ 174/58
7,097,496 B2 * 8/2006 Zhang et al. ................ 439/495
2005/0079740 A1 * 4/2005 Nojima et al. ................ 439/34

FOREIGN PATENT DOCUMENTS

| JP | A 07-203615 | 8/1995 |
| JP | A 11-187539 | 7/1999 |
| JP | 2001-167141 A | 6/2001 |

* cited by examiner

*Primary Examiner*—Jean F Duverne
(74) *Attorney, Agent, or Firm*—Oliff & Berridge, PLC

(57) ABSTRACT

A casing body of a junction box is made of a resin molded product. A vehicle body bracket engaging portion projects from an outer surface of the casing body. The engaging portion is engaged with a vehicle body bracket made of a metal material or other relatively high-strength that projects from a vehicle body. A coupling portion integrates the vehicle body bracket engaging portion with a second engaging portion that is shaped to engage with a separate member, such as a cover that attached to the casing body, thereby reinforcing the vehicle body bracket engaging portion.

12 Claims, 8 Drawing Sheets

ELECTRICAL JUNCTION BOX

This application claims priority from Japanese Patent Application No. 2006-196201, the disclosure of which is incorporated herein by reference in its entirety.

BACKGROUND

This invention relates to an electrical junction box, and more particularly relates to an electrical junction box in which a vehicle body bracket engaging portion is engaged with a vehicle body bracket of a vehicle body, such as an automobile body, to reinforce the vehicle body bracket engaging portion.

There is a structure in which a vehicle body bracket receiving portion of an electrical junction box is engaged with and secured to a vehicle body bracket made of a metal material and projected from a vehicle body to fix the electrical junction box to the vehicle body.

In this case, since a casing of the electrical junction box is made of a resin molded product and the vehicle body bracket receiving portion projected from the casing is engaged with the vehicle body bracket made of a metal material having a high strength, there is a possibility of breaking the vehicle body bracket receiving portion.

Recently, electrical components to be mounted on a motor vehicle, and electrical circuit systems in the vehicle, have increased sharply in connection with increased functionality in the motor vehicle. Consequently, a weight of the electrical junction box increases to two or three times the weight of a conventional electrical junction box. Accordingly, it has been required to enhance strength of the vehicle body bracket receiving portion.

Heretofore, JP 2001-167141 A has disclosed an electrical junction box in which a vehicle body bracket receiving portion to be attached to a mating member is reinforced to prevent the receiving portion from being broken.

In a reinforcing structure for a resin casing disclosed in JP 2001-167141 A, as shown in FIG. 8, a resin casing 1 is provided, on a side wall 2, with bracket holding wall portions 3. An attachment bracket 4 to be fixed on a mating member is provided on an outer surface of the bracket holding wall portion 3. The bracket holding wall portion 3 projects outward from the side wall 2 in a stepped manner. Ribs 5 are integrally provided on an inner surface of the bracket holding wall portions 3 so that the ribs 5 extend in a vertical direction. The ribs 5 increase a thickness of the bracket holding wall portions 3.

SUMMARY

Although the bracket holding wall portions 3 are reinforced by the ribs 5, the attachment bracket 4 is not reinforced. Accordingly, in the case where a mating member (not shown) is made of a metal material or other material that has a high strength, when an excessive load is applied to the attachment bracket, which has a low strength, the attachment bracket 4 may be deformed or broken, and/or a coupling portion between the attachment bracket 4 and the bracket holding wall portion 3 may be broken.

In view of the above problems, an object of exemplary embodiments of the present invention is to provide an electrical junction box in which a vehicle body bracket engaging portion is reinforced to enhance its strength, and in which the receiving portion can be restricted from being deformed or broken in the case where the receiving portion is engaged with a vehicle body bracket made of a metal or other relatively high-strength material.

In order to achieve the above object, embodiments of the present invention provide an electrical junction box constructed as described below. The electrical junction box may be connected to a wire harness arranged in a motor vehicle. A casing body of the junction box is made of a resin molded product. A vehicle body bracket engaging portion projects from an outer surface of the casing body. The engaging portion is engaged with a vehicle body bracket made of a metal or other relatively high-strength material and projected from a vehicle body. The vehicle body bracket engaging portion is integrated, through a coupling portion for reinforcement, with another engaging portion, which engages a separate member, i.e., a member other than the vehicle body bracket. The other engaging portion is projected from the outer surface of the casing body.

According to the above construction, since the vehicle body bracket engaging portion and the other engaging portion are integrated with each other, it is possible to distribute a load applied to the vehicle body bracket engaging portion onto the other engaging portion and to reduce the load applied to the vehicle body bracket engaging portion. Consequently, it is possible to enhance strength of the vehicle body bracket engaging portion by integrating it with the other engaging portion. Accordingly, even if a load from the vehicle body bracket having a relatively high strength is applied to the vehicle body bracket receiving portion, it is possible to reduce the possibility of the vehicle body bracket engaging portion being deformed or broken.

Also, even if a load from the separate member is applied to the other engaging portion, it is possible to reduce the possibility of the other engaging portion being deformed or broken, since it is possible to disperse the load applied to the other engaging portion over the vehicle body bracket receiving portion, to reduce the load applied to the other engaging portion, and to reinforce the other engaging portion by the vehicle body bracket engaging portion to enhance strength of the other engaging portion.

Thus, it is possible to enhance strength of the vehicle body bracket engaging portion and the other engaging portion by mutual reinforcement between the vehicle body bracket engaging portion and the other engaging portion.

The other engaging portion may be a locking portion for another member, such as an upper cover or the like, or may be a holding portion for holding a member separated from the electrical junction box, such as a cassette relay, or a connector.

An upper cover may be mounted on the casing body. The other engaging portion integrated with the vehicle body bracket engaging portion through the coupling portion may be a locking portion that engages with a corresponding locking portion of the upper cover.

In the case where the locking portion of the upper cover is disposed near the vehicle body bracket receiving portion, it is possible to enhance strength of the vehicle body bracket engaging portion by interconnecting the vehicle body bracket engaging portion and the locking portion without requiring much time for a design change, since the vehicle body bracket engaging portion can be integrated with the locking portion without applying a significant design change to the electrical junction box.

Preferably, two vehicle body bracket receiving portions are provided on one outer surface of the casing body and spaced away from each other, and a single vehicle attachment portion projects from another surface be secured to a vehicle body by a bolt or other fastener, thereby fixing the electrical junction box on the vehicle body at three support points.

According to the above construction, the electrical junction box can be fixed on the vehicle body at the three support points. The three support points can distribute a load uniformly without unbalancing the load. Consequently, it is possible to enhance stabilization in attachment of the electrical junction box, to reduce rattling of the electrical junction box, and to reduce the possibility of the vehicle attachment portion and vehicle body bracket engaging portion being broken.

Preferably, the locking portion for the upper cover is disposed at a position higher than the vehicle body bracket receiving portion, the coupling portion projects from a lower end of the locking portion, and a side part of the coupling portion is coupled to a side surface of a peripheral wall of the bracket engaging portion. Also, the vehicle body bracket engaging portion may include the peripheral wall projecting from an outer side surface of the casing body in a frame-like manner, a pawl projecting from an upper part of an inner surface of the peripheral wall opposed to the outer side surface of the casing body, and ribs disposed on the opposite sides of the pawl. The vehicle bracket may be clamped between the ribs and engaged with the pawl.

The vehicle bracket may extend upward to the vehicle body bracket engaging portion while the upper cover may extend downward to the locking portion. Since a load is applied upward when the vehicle bracket is engaged with the vehicle body bracket engaging portion, the locking portion disposed at the position higher than the vehicle body bracket engaging portion can support the load. On the other hand, when the locking portion of the upper cover is inserted downward to engage the locking portion of the casing body, the vehicle body bracket engaging portion disposed at the position lower than the locking portion of the casing body can support the load. Accordingly, the mutual reinforcement between the vehicle body bracket engaging portion and the locking portion of the casing body can enhance their strengths.

Also, when the vehicle bracket is clamped between the ribs and engaged with the pawls, the engaging force with respect to the vehicle bracket is increased. This reduces rattling of the electrical junction box after attaching the electrical junction box to the vehicle body, and reduces the possibility of the vehicle body bracket engaging portion connected to the vehicle body being broken.

Preferably, when ribs are used as described above, pairs of ribs are opposed to one another on the inner surface of the peripheral wall of the vehicle body bracket engaging portion and two pairs of ribs are provided on the opposite sides of the pawl. Alternatively, one pair or more than two pairs of ribs may be provided.

Also, the side part of the coupling portion may be connected to the side surface of the peripheral wall of the vehicle body bracket engaging portion. The coupling portion may extend to a lower end of the vehicle body bracket engaging portion.

As described above, according to exemplary embodiments of the present invention, since the load applied to the vehicle body bracket engaging portion can be distributed onto the other engaging portion to reduce the load applied to the vehicle body bracket engaging portion, and the bracket engaging portion is coupled to the other engaging portion, it is possible to enhance strength of the vehicle body bracket engaging portion. Accordingly, even if a load from a metal vehicle body bracket having a high strength is applied to the vehicle body bracket engaging portion, it is possible to reduce the possibility of the vehicle body bracket engaging portion being deformed or broken. Furthermore, even if a load from another member is applied to the other engaging portion, it is possible to reduce the possibility of the other engaging portion being deformed or broken, since the vehicle body bracket engaging portion reinforces the other engaging portion to enhance strength of the other engaging portion.

Also, when the electrical junction box is fixed at three points on the vehicle body, the three support points for the electrical junction box can distribute a load uniformly without unbalancing the load. Consequently, it is possible to enhance stabilization in attachment of the electrical junction box, to reduce rattling of the electrical junction box, and to reduce the possibility of the vehicle attachment portion and vehicle body bracket engaging portion being broken.

In addition, when the vehicle bracket is clamped between ribs and engaged with pawls as described above, it is possible to enhance an engaging force with respect to the vehicle bracket. This helps to reduce rattling of the electrical junction box after attaching the electrical junction box to the vehicle body, and to reduce the possibility of the vehicle body bracket engaging portion connected to the vehicle body being broken.

BRIEF DESCRIPTION OF THE DRAWINGS

Exemplary embodiments are described below with reference to drawings, wherein like numerals illustrate like parts.

FIG. 2A is a front elevation view. FIG. 2B is a plan view in which an upper cover is removed.

FIG. 3A is a cross sectional view taken along line 3A-3A in FIG. 2B. FIG. 3B is an enlarged sectional view of a main part of FIG. 3A. FIG. 3C is an enlarged sectional view of another main part of FIG. 3A.

FIG. 4A is a front elevation view. FIG. 4B is a plan view. FIG. 4C is a cross sectional view taken along line 4C-4C in FIG. 4B.

FIG. 5A is a front elevation view. FIG. 5B is a plan view.

FIG. 6A is a front elevation view. FIG. 6B is a bottom view. FIG. 6C is a cross sectional view taken along line 6C-6C in FIG. 6B. FIG. 6D is a cross sectional view taken along line 6D-6D in FIG. 6B.

DETAILED DESCRIPTION OF EMBODIMENTS

Figure 1:
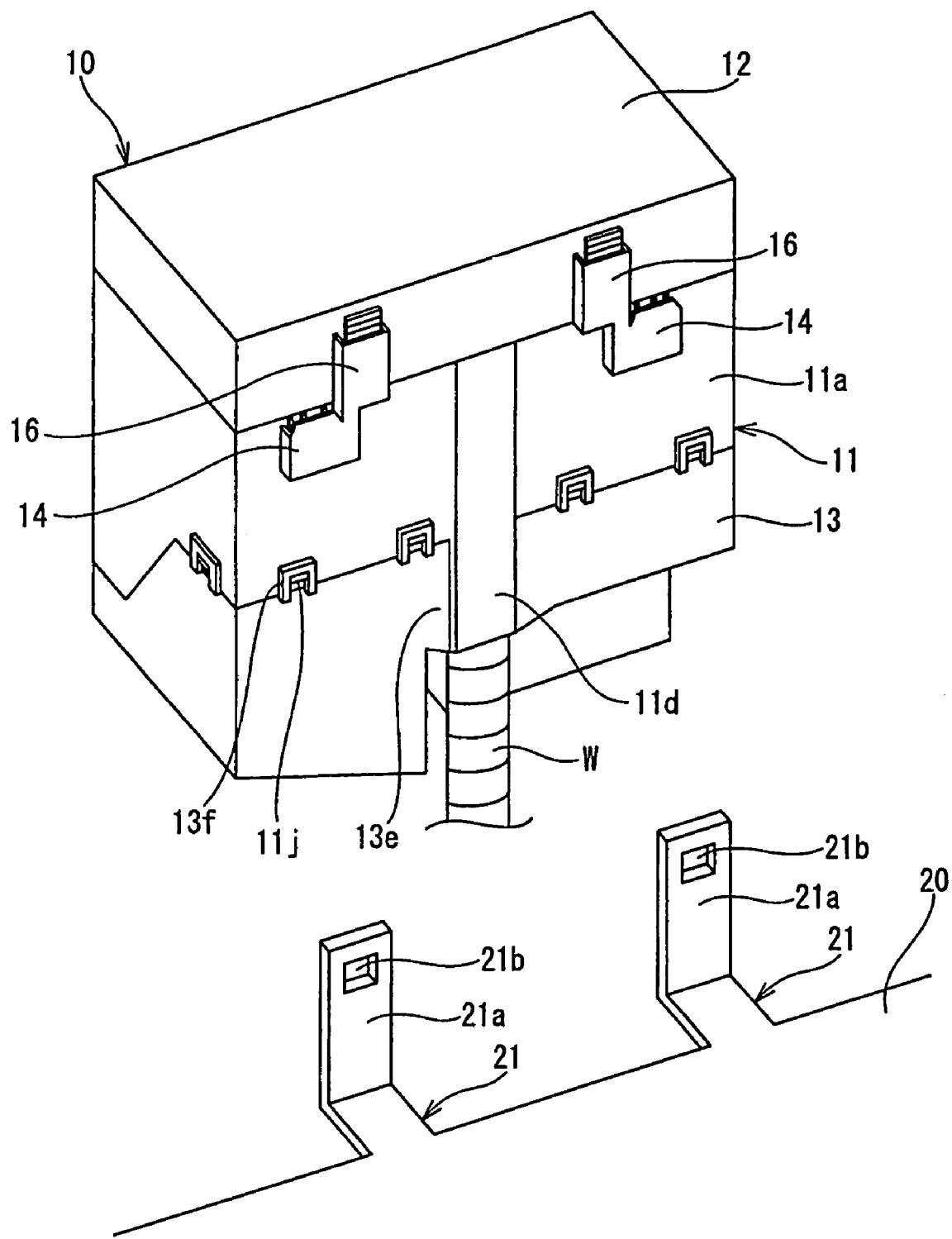
FIG. 1 is a perspective view of an electrical junction box of a first embodiment in accordance with the present invention, illustrating a condition of attaching the electrical junction box to a vehicle body.

Exemplary embodiments of an electrical junction box in accordance with the present invention will be explained by referring to the drawings.

FIGS. 1 through 6 show a first embodiment of the electrical junction box in accordance with the present invention.

As shown in FIG. 1, an electrical junction box 10 includes a casing body 11 made of a resin molded product, an upper cover 12 and a lower cover 13 mounted and locked respectively on the top and bottom of the casing body 11. An interior circuit is contained in the casing body 11 of the electrical junction box 10 and a wire harness W is electrically connected to the interior circuit.

When the junction box 10 is mounted on the vehicle body 20, the electrical junction box 10 is fixed on a vehicle body 20 through vehicle body brackets 21 made of a metal or other relatively high-strength material and projecting from the vehicle body 20.

Each of the vehicle body brackets 21 projecting from the vehicle body 20 has one or more engaging plates 21a (which are L-shaped in this example, but may be other shapes, such as straight, U-shaped, etc.) that extend, typically upward, from the vehicle body 20. As depicted, the engaging plates 21a may be provided on an upper central part with an engaging aperture 21b adapted to receive an engaging pawl 14b on each vehicle body bracket engaging portion 14 (described below) of the electrical junction box 10.

Figure 4A:
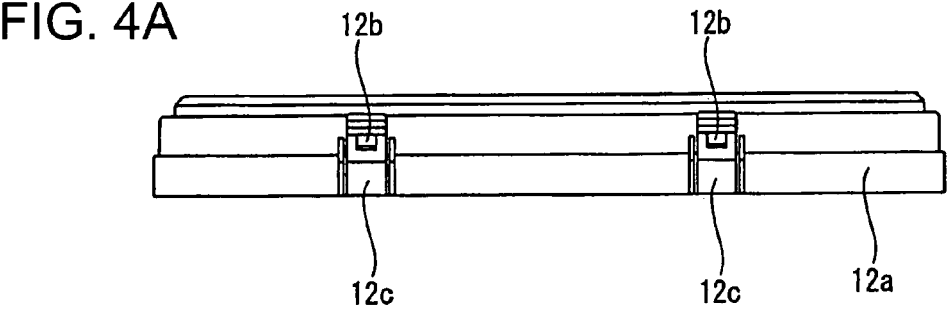
FIGS. 4A through 4C show an upper cover.
Figure 4B:
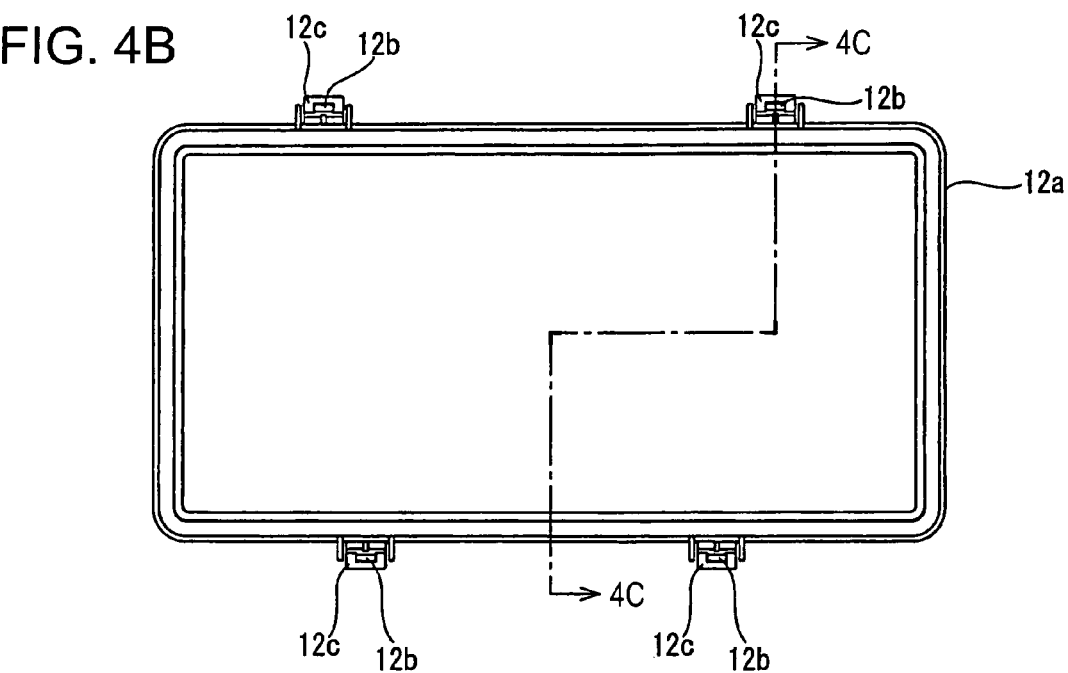
Figure 4C:
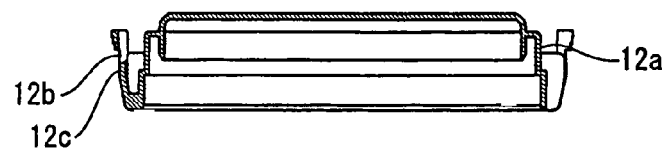

As shown in FIGS. 4A to 4C, a frame-like peripheral wall 12a extends down from an outer periphery of an upper wall on the upper cover 12 of the electrical junction box 10. The peripheral wall 12a is provided on a lower end with locking portions 12c each having an engaging aperture 12b. The locking portions 12c are separate members other than the vehicle body brackets 21.

Figure 2A:
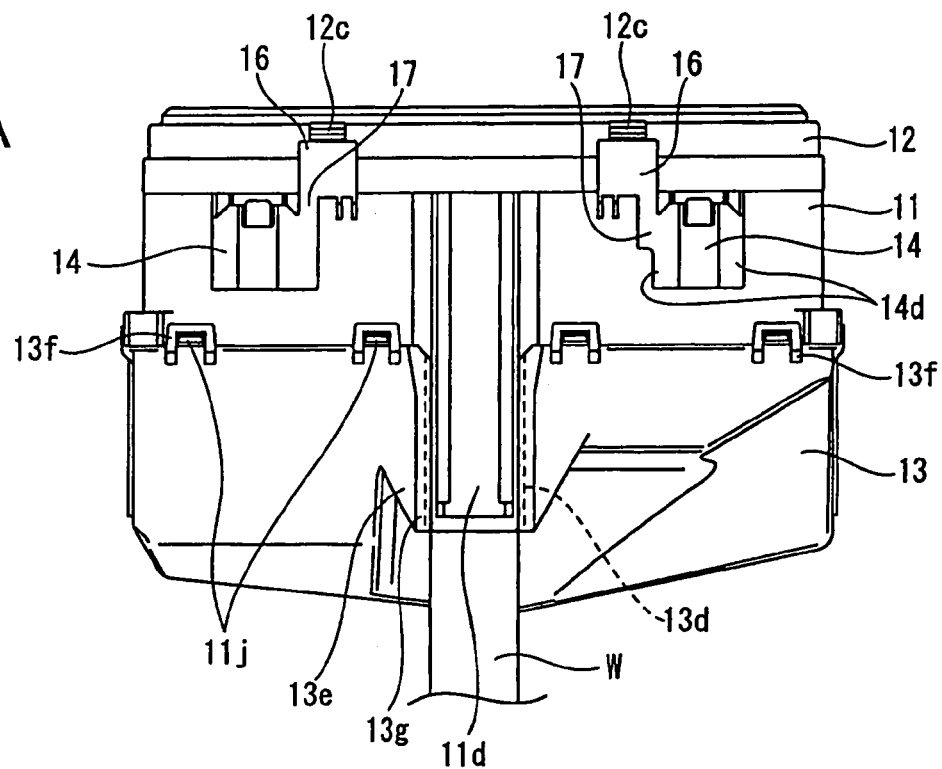
FIGS. 2A and 2B show the electrical junction box shown in FIG. 1.
Figure 2B:
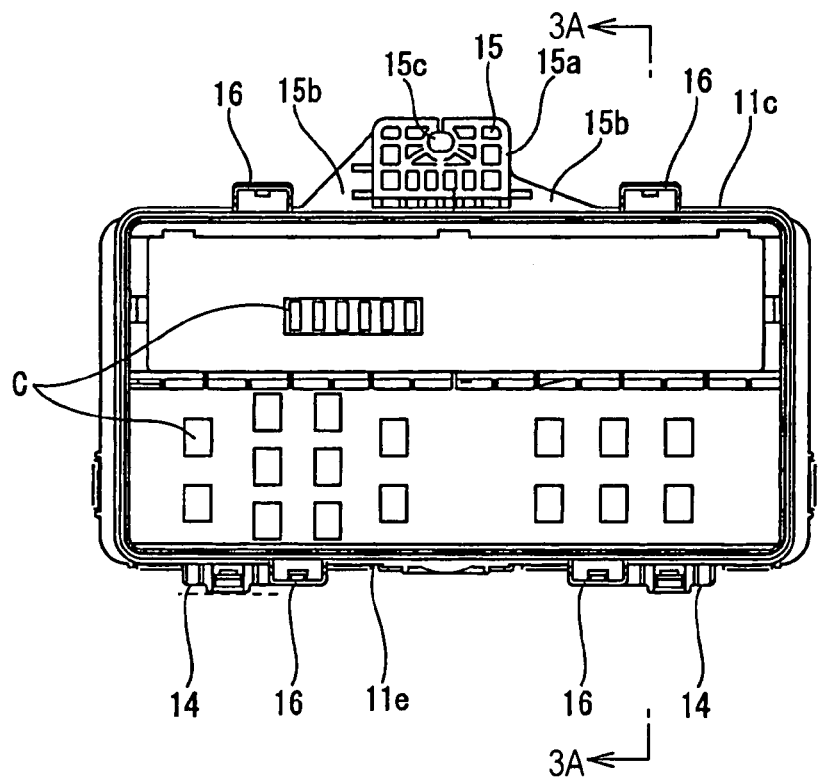
Figure 5A:
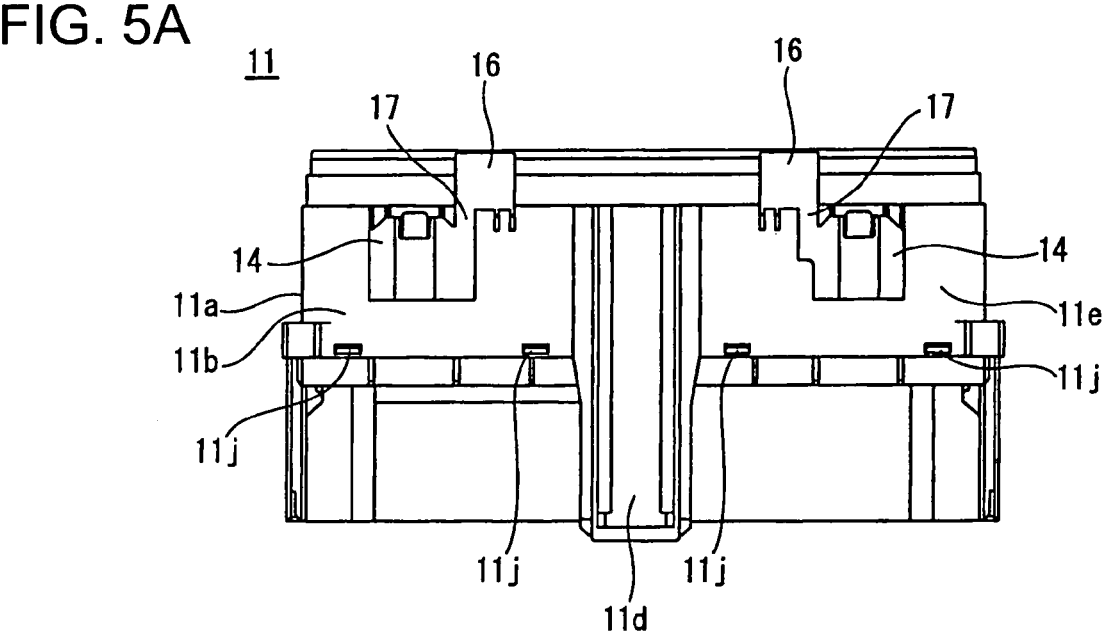
FIGS. 5A and 5B show a casing body.
Figure 5B:
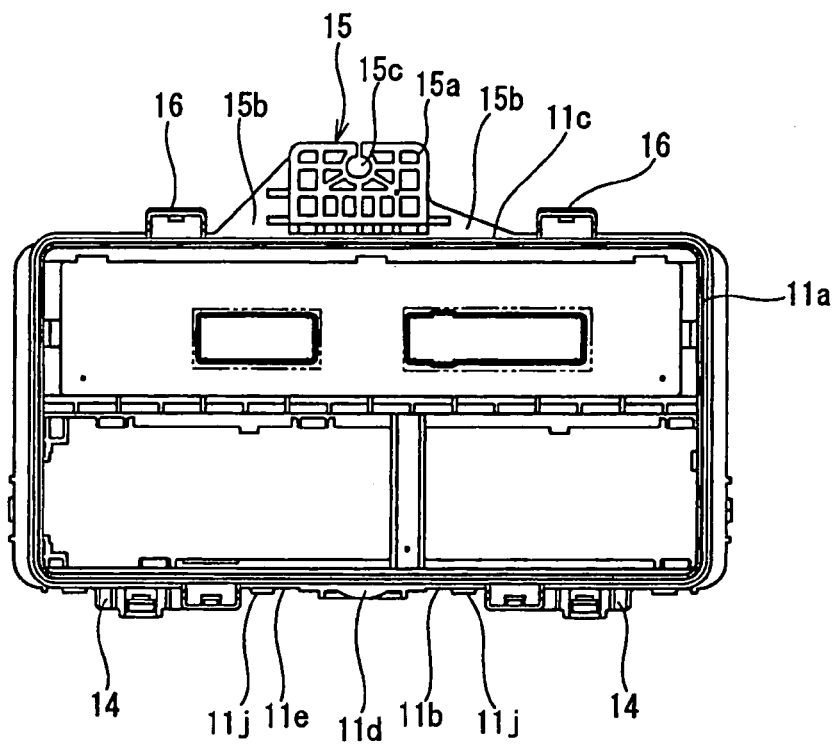

As shown in FIGS. 5A and 5B, the casing body 11 includes a frame-like peripheral wall 11a. As shown in FIG. 2B, electrical components C are contained in the interior surrounded by the peripheral wall 11a of the casing body 11.

The peripheral wall 11a, at a side that attaches to the vehicle body brackets 21, defines a first vehicle body attachment side wall 11b while the peripheral wall 11a opposite to the first vehicle body attachment side wall 11b defines a second vehicle body attachment side wall 11c.

The first vehicle body attachment side wall 11b is provided, on an outer surface 11e, with two vehicle body bracket engaging portions 14 to be engaged with the vehicle body brackets 21. The second vehicle body attachment side wall 11c opposite to the first wall 11b is provided with a single vehicle body attachment portion 15 to be secured to the vehicle body 20 by a bolt. Thus, the electrical junction box 10 is, in the depicted embodiment, fixed on the vehicle body 20 at three support points.

The first vehicle body attachment side wall 11b may be provided on a central lower end with a wire harness guide piece 11d, as depicted, that serves to guide a wire harness W to be connected to the electrical junction box 10.

Each of the first and second vehicle body attachment side walls 11b and 11c are provided on outer, upper parts with locking portions 16 to be coupled to locking portions 12b of the upper cover 12 (FIGS. 4A to 4C). Each locking portion 16 of the first vehicle body attachment side wall 11b is disposed adjacent to a respective vehicle body bracket engaging portion 14 (first engaging portion). The locking portion 16 (second engaging portion) at the upper side and the vehicle body bracket engaging portion 14 at the lower side are integrated with each other through a coupling portion 17 for reinforcement that extends in a vertical direction. That is, in the first embodiment, projections connected to the vehicle body bracket engaging portion 14 define some of the locking portions 16 for the upper cover 12. In this embodiment, and the second embodiment discussed below, elements are integrated with each other by being monolithic with each other, e.g., by being formed together as one piece in the same molding operation.

As shown in FIGS. 5A and 5B, for example, on the first vehicle body attachment side wall 11b, structures each constituted by (i) one locking portion 16, (ii) one vehicle body bracket engaging portion 14 and (iii) one coupling portion 17 are disposed symmetrically with respect to the wire harness guiding piece 11d.

As shown in FIGS. 6A to 6D, each vehicle body bracket engaging portion 14 is provided with a frame-like peripheral wall 14a that projects from an outer surface 11e of the first vehicle body attachment side wall 11b. The peripheral wall 14a has a convex shape in cross section and comprises side walls 14b projecting outward from the outer surface 11e of the first vehicle body attachment side wall 11b, a first peripheral wall 14c opposed to the outer surface 11e of the first vehicle body attachment side wall 11b, and a second peripheral wall 14d projecting from the first peripheral wall 11c in a U-shaped manner. A space surrounded by the side wall 14b and the first and second peripheral walls 14c and 14d defines a bracket containing space BS.

The second peripheral wall 14d is provided on an inner surface with a cantilever-type elastic piece 14e that is substantially in parallel with the outer surface 11e of the first vehicle body attachment side wall 11b and has a free end. A pawl 14f projects from an upper part, or other appropriate part, of the elastic piece 14e.

Two pairs of first ribs 14g-1 extend from the outer surface 11e of the first vehicle body attachment side wall 11b and each pair of first ribs 14g-1 are disposed on the opposite sides of the elastic piece 14e so that two pairs of first ribs 14g-1 are spaced from each other. Meanwhile, two pairs of second ribs 14g-2 are provided on the inner surface of the first peripheral wall 14c to be opposed to the two pairs of first ribs 14g-1, respectively. A clearance S1 is formed between each of the first ribs 14g-1 and a respective one of the second ribs 14g-2. Four pairs of ribs are disposed in the bracket containing space BS. Of course, other numbers of ribs acceptable.

Figure 6A:
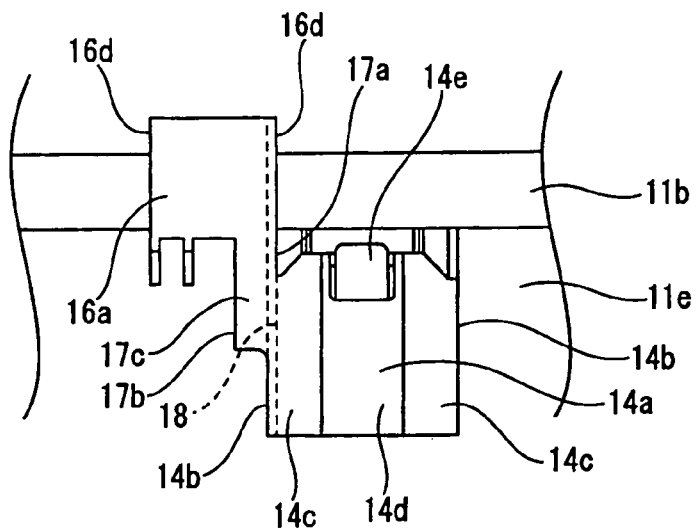
FIGS. 6A through 6D show a vehicle body bracket engaging portion and a locking portion.
Figure 6B:
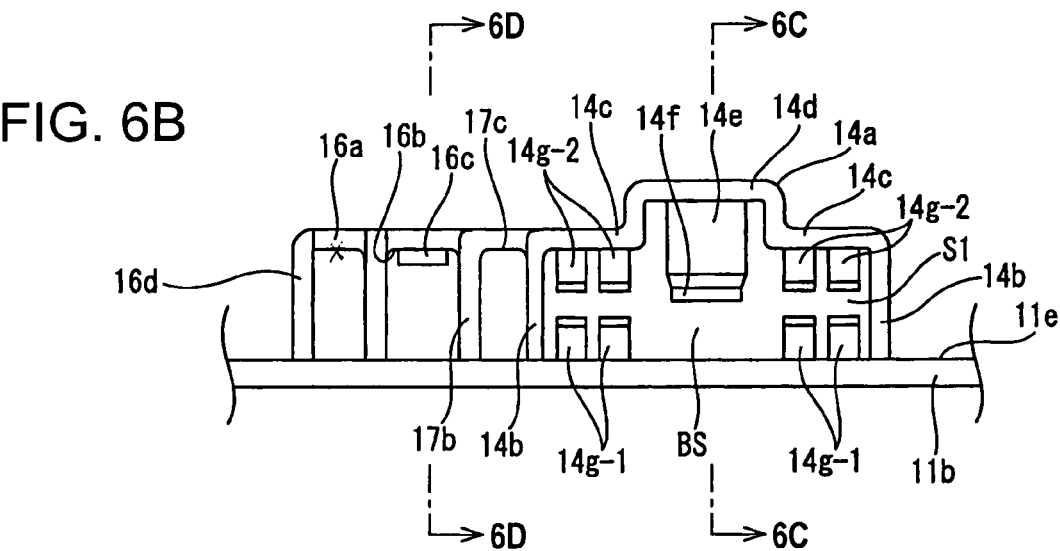
Figure 6C:
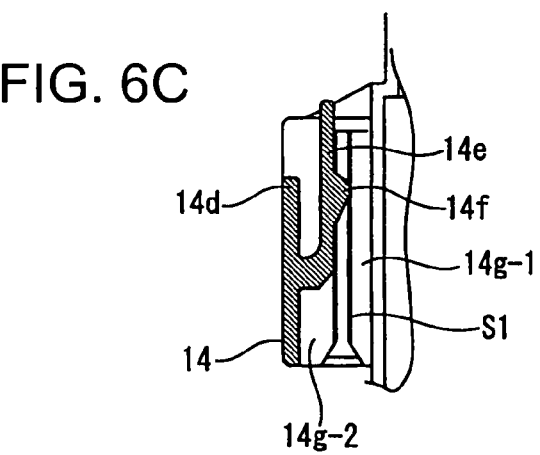
Figure 6D:
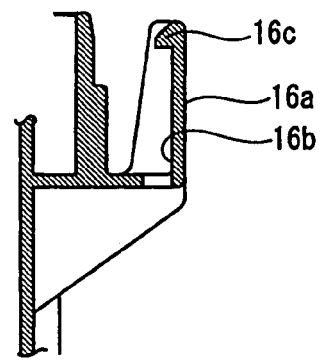

Each of the locking portions 16 includes a peripheral wall 16a, which projects from the outer surface 11e of the first vehicle body attachment side wall 11b in a frame-like manner, and a pawl 16c, which is disposed at a position opposed to the first vehicle body attachment side wall 11b on an inner surface 16b of the peripheral wall 16a opposed to the outer surface 11e of the first vehicle body attachment side wall 11b. One of the side walls 16d of the locking portions 16, as shown in FIG. 6A, is connected to a first side wall 17a of a coupling portion 17 described below.

The coupling portion 17 is formed into a box-like configuration and includes a first side wall 17a and a second side wall 17b that project from the outer surface 11e of the first vehicle body attachment side wall 11b, and a third side wall 17c opposed to the outer surface 11e of the first vehicle body attachment side wall 11b. The coupling portion 17 extends down from a lower end of the locking portion 16.

The third side wall 17c is connected to the first peripheral wall 14c of the vehicle body bracket engaging portion 14 and to the peripheral wall 16a of the locking portion 16. The first side wall 17a of the coupling portion 17 is connected to a part of the side wall 16d of the locking portion 16 and to a part of the side wall 14b of the bracket engaging portion 14. Parts of the first side wall 17a and side wall 14b become a common wall 18. A length of the second side wall 17b of the coupling portion 17 is the same as that of the common wall 18.

Figure 3A:
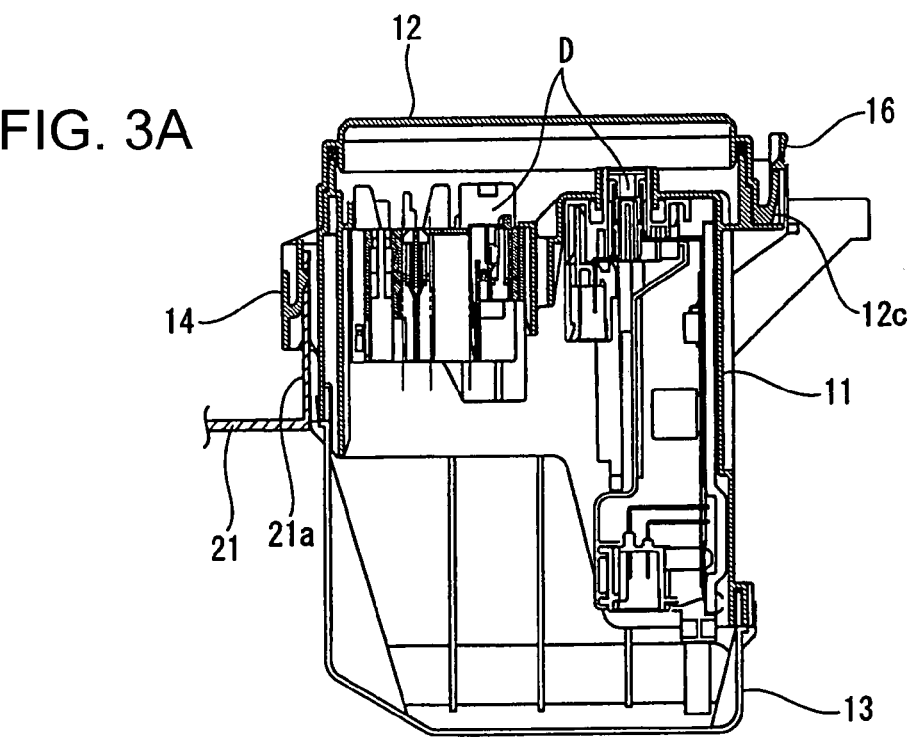
FIGS. 3A through 3C show the electrical junction box fixed on a vehicle body bracket.
Figure 3B:
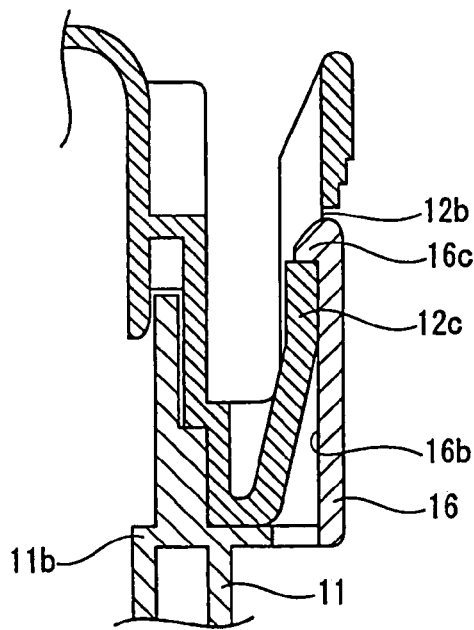

As shown in FIG. 3B, the upper cover 12 is mounted on the casing body 11. The pawl 16c of the locking portion 16 on the casing body 11 is fitted in the engaging aperture 12b in the locking portion 12c of the upper cover 12 to complete a locking connection. It will be appreciated that, instead of the structure described above, a structure can be used in which a pawl is formed on the locking portion 12c and a corresponding aperture is formed in the locking portion 16.

As shown in FIG. 5B, the vehicle body attachment portion 15 projects horizontally from the outer surface of the second vehicle body attachment side wall 11c of the casing body 11. A bolt aperture 15c may be provided in, e.g., a central part of the body portion 15a of the vehicle body attachment portion 15 so that the vehicle body attachment portion 15 can be secured to an attachment portion on the vehicle body 20 by a bolt or other fastener.

The peripheral wall 11a of the casing body 11 is provided on a lower part with a plurality of pawls 11j spaced away from one another at a given distance. As shown in FIGS. 1 and 2A, the pawls 11j are locked to locking frame portions 13f of the lower cover 13 to mount the lower cover 13 on the lower end of the casing body 11. It will be appreciated that, instead of the structure described above, a structure can be used in which pawls are formed on the lower cover 13 and corresponding locking frame portions are formed on the casing body 11.

As shown in FIG. 2A, the wire harness W connected to the casing body 11 is inserted into a wire harness insertion aperture 13d in the lower cover 13. The wire harness guiding piece 11d contacts with an outer surface 13g of a wire harness insertion portion 13e when the lower cover 13 is mounted on the casing body 11.

Figure 3C:
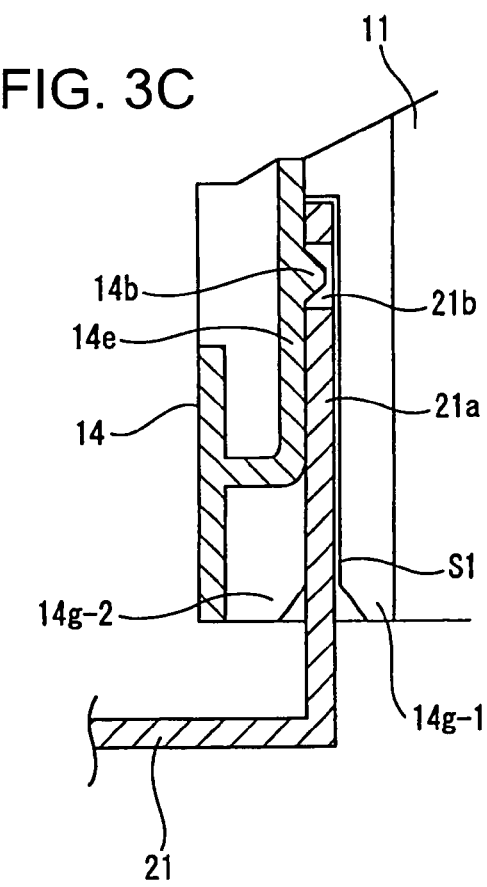

When the electrical junction box 10 constructed above is installed in the vehicle, the vehicle body bracket engaging portion 14 engages the vehicle body brackets 21, as shown in FIG. 3C.

In more detail, the engaging portion 21a of each vehicle body bracket 21 is inserted upward into the clearance S1 between the ribs 14g-1 and 14g-2 opposed to each other in the vehicle body bracket engaging portion 14. The pawl 14b is fitted in the engaging aperture 21b in the vehicle body bracket 21. The engaging portion 21a of the vehicle body bracket 21 is clamped in the clearance S1 between the ribs 14g-1 and 14g-2. Thus, the electrical junction box 10 is fixed on the vehicle body brackets 21. It will be appreciated that, instead of the structure described above, a structure can be used in which pawls are formed on the brackets 21, and corresponding apertures are formed in the elastic pieces 14e.

Also, the body portion 15a of the vehicle body attachment portion 15 projecting from the casing body 11 may be put on an attachment portion (not shown) on the vehicle body 20 and secured to the vehicle body 20 by a bolt passing through the bolt aperture 15c. The vehicle body attachment portion 15 is provided on the opposite sides of the plate-like body portion 15a with reinforcement ribs 15b for reinforcing the body portion 15a.

According to the above construction, since the vehicle body bracket engaging portions 14 are connected to the locking portions 16 through the coupling portions 17, it is possible to enhance strength of the vehicle body bracket engaging portions 14. Accordingly, even if a load from the metal vehicle body bracket 21 having a high strength is applied to the vehicle body bracket engaging portions 14, it is possible to reduce the possibility of the vehicle body bracket engaging portions 14 being deformed or broken.

It is also possible to enhance stabilization in attachment of the electrical junction box 10 by fixing the box 10 on the vehicle body 20 at the three support points, to reduce rattling of the electrical junction box 10, and to reduce the possibility of the vehicle attachment portion 15 and vehicle body bracket engaging portions 14 being broken.

Furthermore, since the pawls 14b of the vehicle body bracket engaging portions 14 are fitted in the engaging apertures 21b in the vehicle body brackets 21 and the vehicle body bracket portions 14 are clamped in the clearance between the ribs 14g-1 and 14g-2 provided on the vehicle body bracket engaging portions 14, it is possible to enhance an engaging force with respect to the vehicle body brackets 21. Accordingly, it is possible to reduce rattling of the electrical junction box 10 mounted on the vehicle body 20 and to reduce the possibility of the vehicle body bracket engaging portions 14 coupled to the vehicle body 20 being broken.

Figure 7:
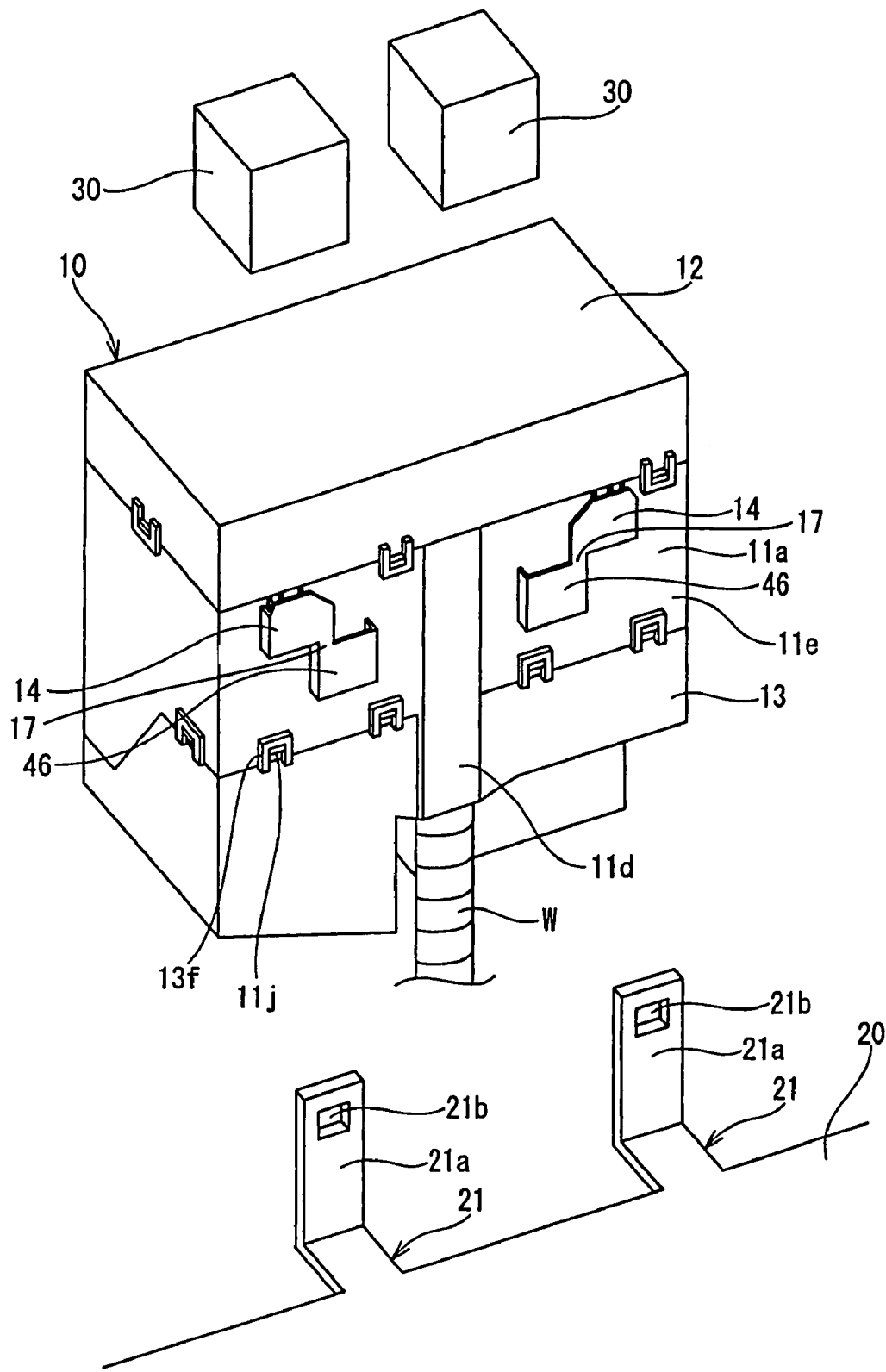
FIG. 7 shows a second embodiment of the present invention.
Figure 8:
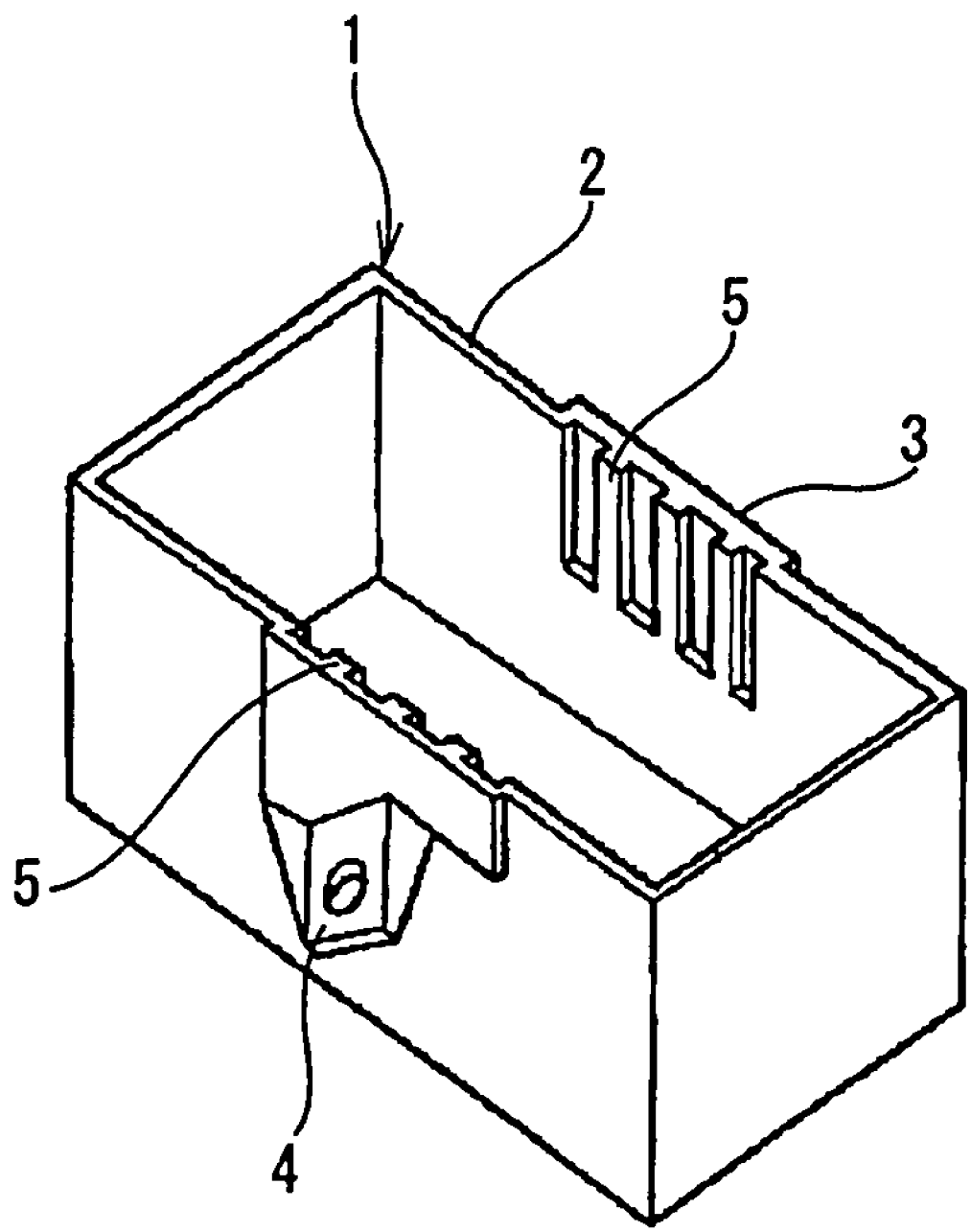
FIG. 8 shows a conventional resin casing.

FIG. 7 shows a second embodiment of an electrical junction box 10 in accordance with the present invention.

The second embodiment differs from the first embodiment with respect to the fact that projections to be connected to the vehicle body bracket portions 14 are connector holding portions 46 projecting from the outer surface of the casing body 11. Each connector holding portion 46 holds a joint connector 30 on the outer surface of the electrical junction box 10. The joint connectors are separate members other than the vehicle body brackets 21. The joint connectors 30 may, for example, be joint connectors that house electrical terminals (not shown), which may be connected to wires in a wiring harness. The joint connectors 30 need not be (but may be) connected to devices or terminals within the junction box 10. The junction box 10 may, for example, simply be used as an anchor point to securely hold the joint connectors 30 in desired locations. Additionally, instead of the locking structures described above in connection with the casing body 11 and the top cover 12, the top cover 12 in the second embodiment may be locked to the casing body with structures similar to those described above in connection with the casing body 11 and the lower cover 13.

A side frame of the connector holding portion 46 is integrated with the vehicle body bracket engaging portion 14 through the coupling portion 17.

Thus, it is possible to enhance strength of the connector holding portion 46 as well as to enhance strength of the vehicle body bracket engaging portion 14 by interconnecting the vehicle body bracket engaging portion 14 and the connector holding portion 46 via the coupling portion 17.

Since the other structures and operational effects in the second embodiment are the same as those in the first embodiment, a further explanation is omitted by applying the same signs to the same elements.

While the invention has been described above in connection with exemplary embodiments, these embodiments should be viewed as illustrative and not limiting. Various changes, substitutes and/or improvements are possible within the spirit and scope of the invention.

What is claimed is:

1. An electrical junction box, comprising:
   a casing body made of a resin molded product;
   a first engaging portion that is shaped to engage with a vehicle body bracket connected to a vehicle body, the first engaging portion being projected from and integrated with an outer surface of the casing body;
   a second engaging portion that is shaped to engage with a separate member, the separate member being a member other than the vehicle body bracket, and not being integrated with the casing body, the second engaging portion being projected from and integrated with the outer surface of the casing body; and
   a coupling portion that integrates the first engaging portion and the second engaging portion, and is formed together as one piece with the first engaging portion and the second engaging portion in the same molding operation, thereby reinforcing the first engaging portion.

2. An electrical junction box according to claim 1, wherein two of said first engaging portion are provided on a first side of the outer surface of the casing body, the two first engaging portions being spaced away from each other, and wherein a single vehicle attachment portion projects from a second side of the outer surface, opposed to the first side, to be secured to a vehicle body by a bolt or other fastener, thereby fixing the electrical junction box to the vehicle body at three support points.

3. An electrical junction box according to claim 1, wherein a continuous wall forms a side wall of the first engaging portion and a side wall of the second engaging portion.

4. An electrical junction box according to claim 1, the first engaging portion having a peripheral wall, the second engaging portion being disposed at a position higher than the first engaging portion, an upper part of an inner surface of the peripheral wall opposed to an outer side surface of the casing body including a locking element.

5. An electrical junction box according to claim 4, wherein the coupling portion projects from a lower end of the second engaging portion, and a side part of the second engaging portion is coupled to a side surface of the peripheral wall of the first engaging portion.

6. An electrical junction box, comprising:
a casing body made of a resin molded product;
a first engaging portion that is shaped to engage with a vehicle body bracket connected to a vehicle body, the first engaging portion being projected from and integrated with an outer surface of the casing body;
a second engaging portion that is shaped to engage with a separate member, the separate member being a member other than the vehicle body bracket, the second engaging portion being projected from and integrated with the outer surface of the casing body; and
a coupling portion that integrates the first engaging portion and the second engaging portion, thereby reinforcing the first engaging portion;
wherein the separate member that engages with the second engaging portion is an upper cover that is mounted on the casing body and covers a top opening of the casing body.

7. An electrical junction box according to claim 6, wherein two of said first engaging portion are provided on a first side of the outer surface of the casing body, the two first engaging portions being spaced away from each other, and wherein a single vehicle attachment portion projects from a second side of the outer surface, opposed to the first side, to be secured to a vehicle body by a bolt or other fastener, thereby fixing the electrical junction box to the vehicle body at three support points.

8. An electrical junction box according to claim 7, wherein the second engaging portion is disposed at a position higher than the first engaging portion, the coupling portion projects from a lower end of the second engaging portion, and a side part of the second engaging portion is coupled to a side surface of a peripheral wall of the first engaging portion,
wherein said first engaging portion includes (i) the peripheral wall, which projects from an outer side surface of the casing body, an upper part of an inner surface of the peripheral wall opposed to the outer side surface of the casing body including a locking element, and (ii) ribs disposed on opposite sides of the locking element, and
wherein the vehicle bracket is clamped between the ribs and is engaged with the locking element.

9. An electrical junction box according to claim 6, wherein the second engaging portion is disposed at a position higher than the first engaging portion, the coupling portion projects from a lower end of the second engaging portion, and a side part of the second engaging portion is coupled to a side surface of a peripheral wall of the first engaging portion,
wherein said first engaging portion includes (i) the peripheral wall, which projects from an outer side surface of the casing body, an upper part of an inner surface of the peripheral wall opposed to the outer side surface of the casing body including a locking element, and (ii) ribs disposed on opposite sides of the locking element, and
wherein the vehicle bracket is clamped between the ribs and is engaged with the locking element.

10. An electrical junction box according to claim 6, wherein a continuous wall forms a side wall of the first engaging portion and a side wall of the second engaging portion.

11. An electrical junction box according to claim 6, the first engaging portion having a peripheral wall, the second engaging portion being disposed at a position higher than the first engaging portion, an upper part of an inner surface of the peripheral wall opposed to an outer side surface of the casing body including a locking element.

12. An electrical junction box according to claim 11, wherein the coupling portion projects from a lower end of the second engaging portion, and a side part of the second engaging portion is coupled to a side surface of the peripheral wall of the first engaging portion.

* * * * *